United States Patent

[11] 3,610,531

| [72] | Inventor | Lennart G. Erickson<br>2075 Pioneer Court, San Mateo, Calif. 94402 |
|---|---|---|
| [21] | Appl. No. | 767,955 |
| [22] | Filed | Oct. 16, 1968 |
| [45] | Patented | Oct. 5, 1971 |

[54] APPARATUS FOR SPRINKLER IRRIGATION
6 Claims, 13 Drawing Figs.

[52] U.S. Cl. .................................................. 239/191, 239/213, 239/444
[51] Int. Cl. ..................................................... B05b 3/18
[50] Field of Search ........................................... 239/1, 191, 69, 99, 265.25, 265.29, 444, 212, 239, 63, 177, 213, 191, 192

[56] References Cited

UNITED STATES PATENTS

| 2,741,510 | 4/1956 | McCulloch | 239/213 X |
| 2,834,634 | 5/1958 | Johnson | 239/213 X |
| 2,893,643 | 7/1959 | Gordon | 239/191 X |
| 3,114,243 | 12/1963 | Winters | 239/63 X |
| 3,118,606 | 1/1964 | Rotunda | 239/70 |
| 3,195,816 | 7/1965 | Mercer | 239/63 |
| 1,038,060 | 9/1912 | Zint | 239/444 X |
| 2,081,510 | 5/1937 | Smart | 239/444 |
| 2,625,429 | 1/1953 | Coles | 239/444 |
| 2,726,895 | 12/1955 | Behlen | 239/191 X |
| 3,381,893 | 5/1968 | Smith, Jr. et al. | 239/1 |
| 3,386,661 | 6/1968 | Olson et al. | 239/177 |

*Primary Examiner*—Lloyd L. King
*Attorney*—Townsend and Townsend

ABSTRACT: Sprinkler irrigation in which water is flowed intermittently through sprinkler apparatus during each watering shift. This "on-off" application of water results in an increased rate of infiltration of the water into the soil. Mobile sprinkler apparatus is used to illustrate the intermittent application of the water. The apparatus is provided with means for draining residual water so that movement occurs when empty and during the nonflow periods. The water can also be used as a means of self-propulsion of the mobile sprinkler apparatus. Energy from water flow is stored in a spring energized by a water driven ram for use during periods of nonflow of water.

PATENTED OCT 5 1971
3,610,531
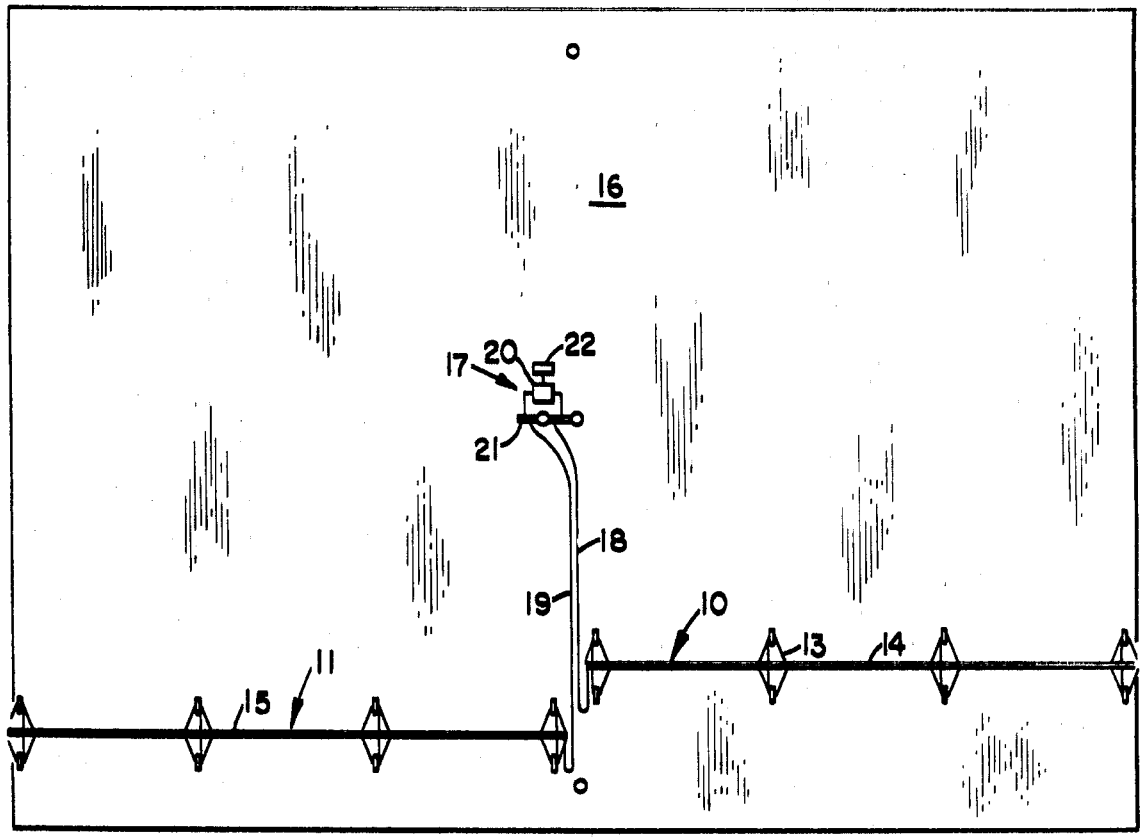
FIG_1
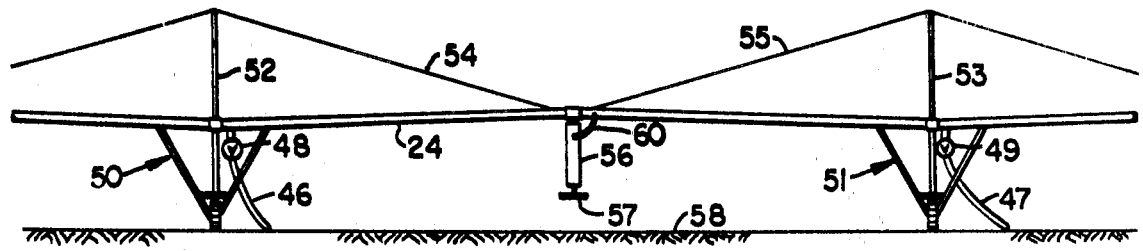
FIG_7
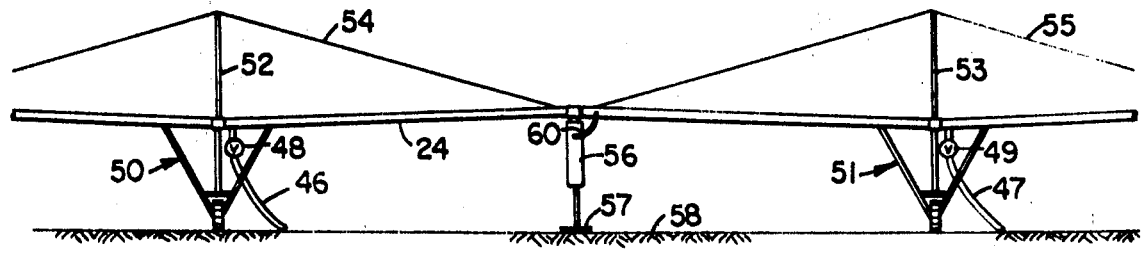
FIG_8
INVENTOR.
LENNART G. ERICKSON
BY
Townsend and Townsend
ATTORNEYS

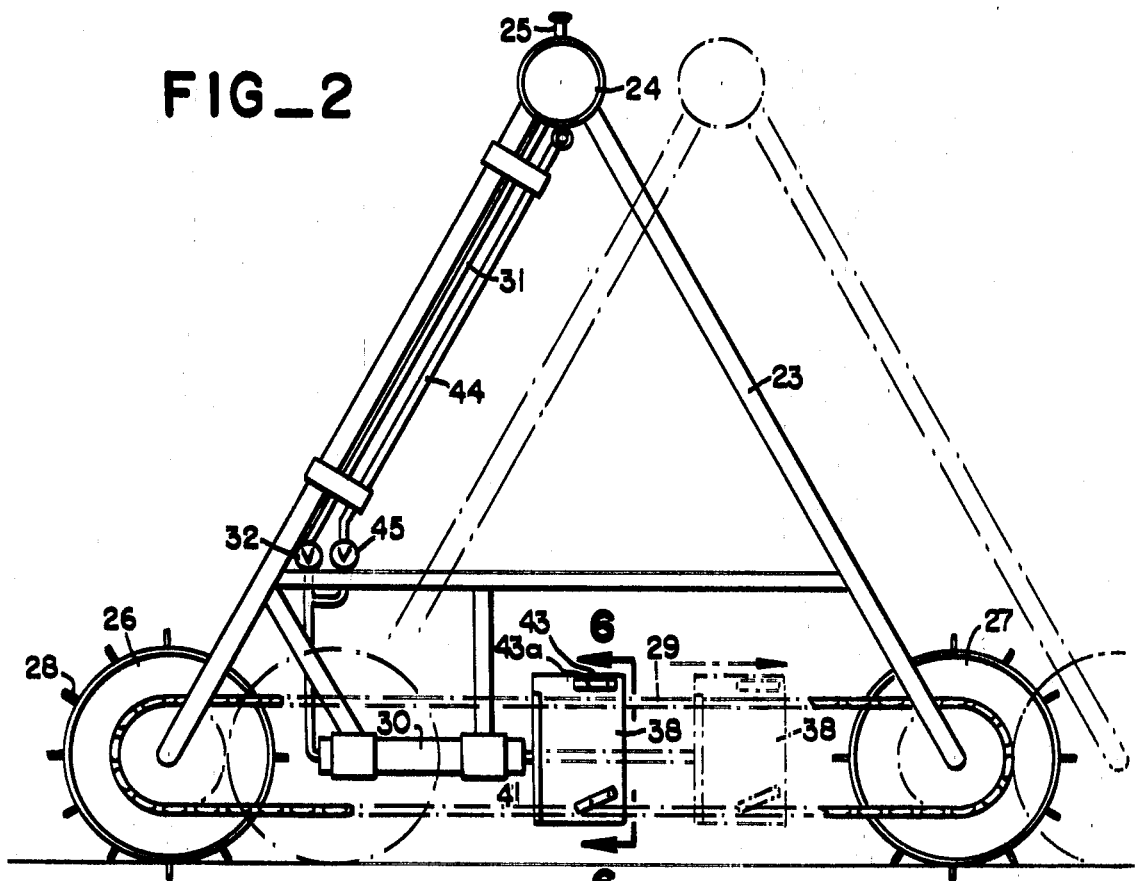
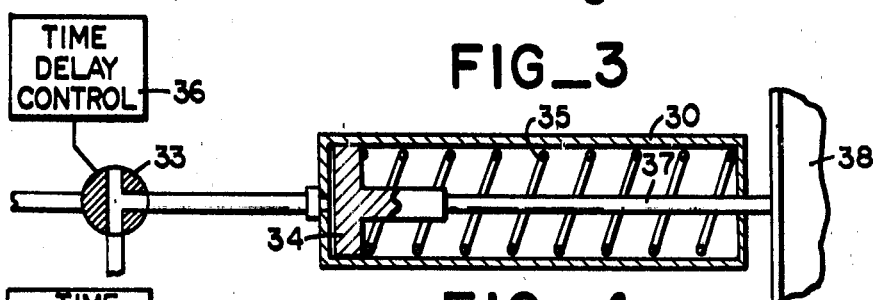
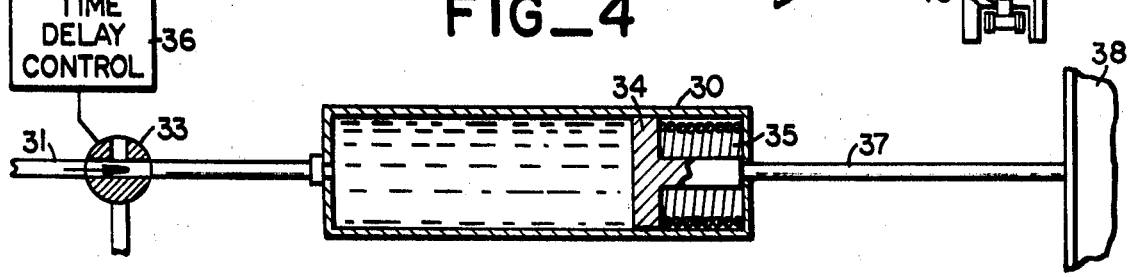

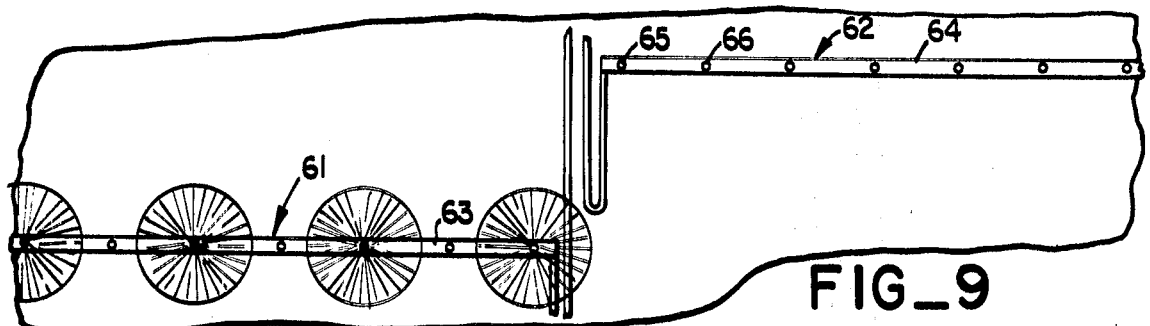
FIG_9
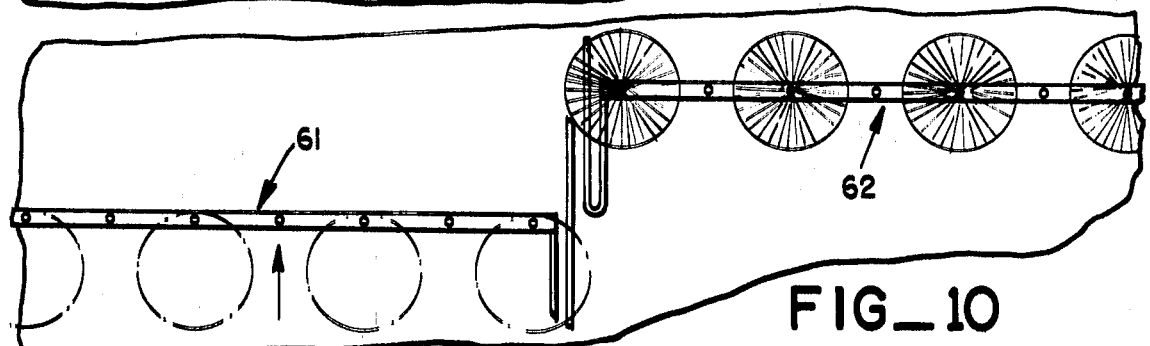
FIG_10
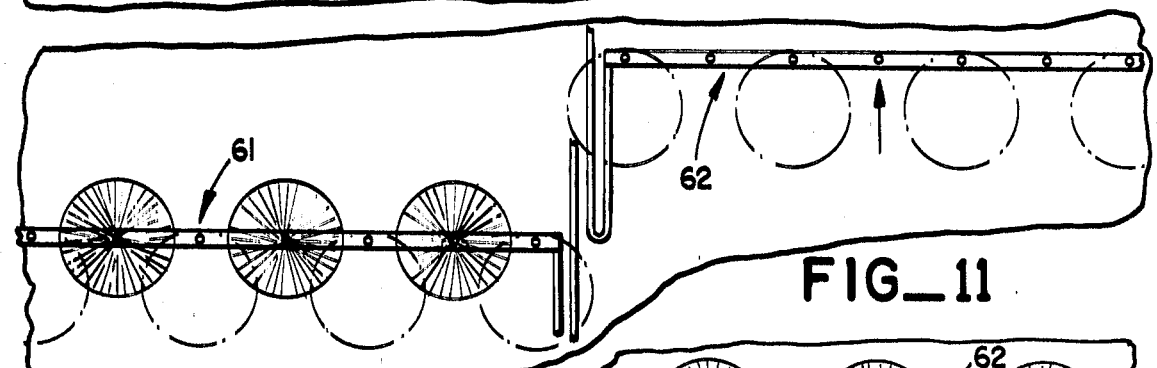
FIG_11
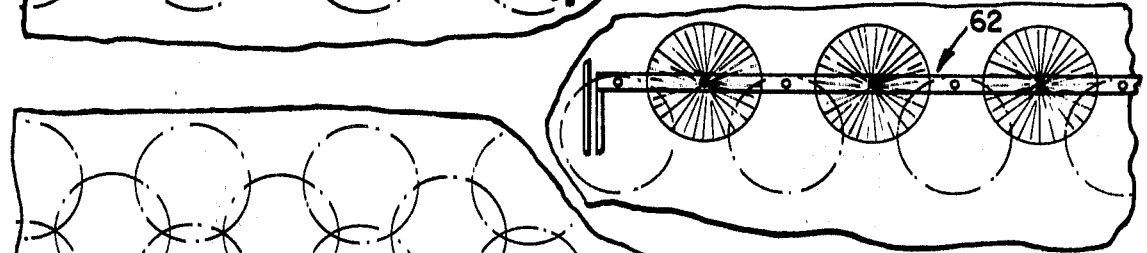
FIG_12
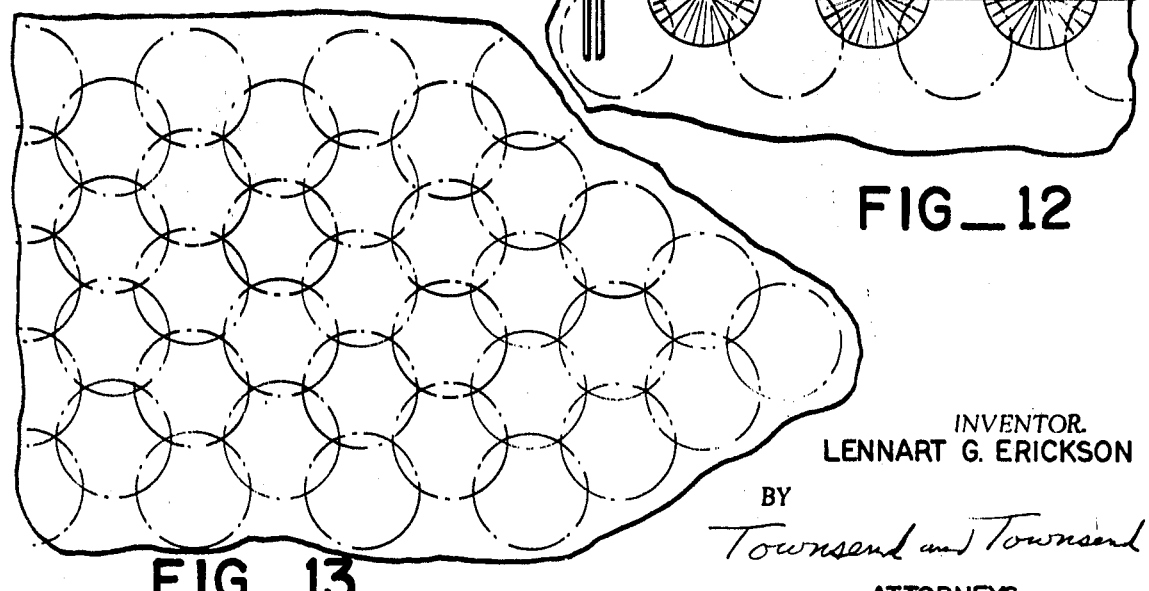
FIG_13
*INVENTOR.*
LENNART G. ERICKSON
BY
Townsend and Townsend
ATTORNEYS

APPARATUS FOR SPRINKLER IRRIGATION

This invention relates to irrigation methods and apparatus and more particularly to the sprinkler type of water distribution.

In its broadest aspects, the present invention contemplates a method wherein water is sprinkled on soil intermittently. This is accomplished by flowing water through a suitable sprinkler system during a plurality of separated time intervals within a particular watering shift. Waterflow is terminated through the sprinkler system during the periods between these separated time intervals of waterflow.

A watering "shift" or "set" is that duration selected by the farmer that a particular area under irrigation is to be subjected to the artificial application of water. Typically, the shift may be a 12 or 20-hour period at the end of which the farmer would cease irrigation at the situs and turn his efforts to another area. In all prior sprinkler irrigation, the sprinkling apparatus has been operated on a constant waterflow basis throughout the watering shift.

It has now been discovered that by sprinkling water on the soil intermittently more efficient irrigation is achieved because the infiltration of water into the soil is considerably higher than where the water is applied on a continuous basis. A higher infiltration rate permits more water application during an irrigation shift or set which in turn permits less frequent irrigation periods for a given piece of land, or the shift can be shortened for deposition of the same amount of water. One practical advantage that follows from the need for less frequent or shorter periods of irrigation is that more total land can be irrigated with a given amount of irrigation equipment.

The "on-off" concept of sprinkler irrigation provides a vehicle through which a great deal of control over the soil moisture level can be exercised. Each area of soil can easily be supplied with just that amount of water needed under the particular circumstances by selection of the appropriate duration of the waterflow intervals. If more water is needed later, the collective magnitude of the separated time intervals of waterflow can be increased and the time periods between the intervals of waterflow correspondingly decreased. Conversely, in crops and soil requiring less water than initially applied, these time intervals of waterflow can be shortened.

A further degree of control is provided by the "on-off" flow sequence. As is well understood, the rate at which soil takes up water is not linear. Soil usually takes water more rapidly in the beginning of the irrigation period than at the end.

Current practice is to adjust the rate of sprinkler water application low enough to avoid puddling and runoff waste and erosion at the end of the irrigation. Consequently, at the start of the irrigation period water is supplied at a rate far below the soil's capacity for absorption.

Given the particular characteristics of the area to be irrigated, the present invention contemplates programming the length of the time intervals of waterflow to correspond with the water uptake or water infiltration rate of the soil. For example, the on-periods of waterflow can be longer at the beginning of a watering shift than at the end of the same shift when the infiltration rate is greater at the beginning than at the end of the shift.

With the intermittent technique of this invention any water application rate including very low rates can be accomplished. It has previously been considered that the only way to accomplish relatively low water application rates is to use relatively small water nozzles and a low waterflow rate to the nozzles. Such an approach requires a long irrigation period and extensive networks of pipelines and sprinklers because the effective water projection radius of the small nozzle sprinklers is small. In the present invention relatively very large nozzles and high flow rates can be employed with attendant wide spacing of the pipelines and related apparatus. Control over the total amount of water applied is obtained by adjustment of the proportion of time that water is actually flowed through the sprinklers.

The present concept thus provides unlimited flexibility in meeting varying moisture requirements during the crop year from seed germination to plant maturity. It also provides the capability of compensating the amount of water applied in relation to weather changes. Of considerable practical importance, the technique permits adaptation of the watering shift duration to the farmer's daily working schedule.

In the preferred embodiment the principle of intermittent sprinkling is applied to a mobile line type of sprinkler system. In one aspect it is convenient to use sprinkler lines or laterals in pairs and to supply them from a common water supply conduit. Where the water is applied intermittently it is convenient to alternate between the two lines to achieve the intermittent irrigation. A constant supply flow can be maintained with the water being shifted from one to the other of the sprinkler lines in accordance with a preselected irrigation schedule.

The intermittent waterflow provides other advantages particularly in relation to mobile-line-type sprinkler apparatus. The weight of the water in an irrigation sprinkler line is substantial, usually more than 70 percent of the weight of the entire moving sprinkler system. In prior systems where the sprinklers were operated continuously during the water shift, the weight of the water necessarily had to be moved along with the irrigation apparatus. In the present invention, apparatus is provided for draining residual water in the sprinkler line at the end of a waterflow sequence following which the empty sprinkler line can be moved free of the weight of the water.

A further preferred aspect of the apparatus of this invention employs the intermittent flow characteristics of the water as a source of energy for moving the sprinkler line. Energy from the waterflow is stored during periods of waterflow and used during periods of nonflow to move the sprinkler line. To this end a spring is tensioned by a water driven piston during the time of waterflow. The spring is controllably released at the appropriate time for producing the motive force for the line during periods of nonflow. As will be explained more fully, the same concept can be used for supporting elevated portions of the sprinkler line.

Another important feature of the mobile apparatus of this invention is the achievement of the optimal triangular pattern of irrigation. This is accomplished by providing individually operable valves for each of the sprinkler heads along a given sprinkler line lateral. By operating first for example only the odd-numbered sprinkler heads, moving the lateral, and then operating only the even-numbered sprinkler heads, a triangular irrigation pattern is obtained. If desired, the intermittent water supply contemplated by this invention may be employed to actuate the valves in the sprinkler heads.

A number of other features and advantages will be discussed in connection with the drawings.

In the accompanying drawings:

FIG. 1 shows a schematic top view of a pair of mobile sprinkler lines which can be intermittently supplied from a common water source in accordance with the invention.

FIG. 2 is a side elevation showing motive apparatus useful in a mobile sprinkler line designed for storing energy during periods of waterflow for use during periods of nonflow of water.

FIG. 3 is a side sectional view of a suitable ram and spring useful for storing water generated energy and useful in the apparatus of FIG. 2.

FIG. 4 is a side sectional view of the ram and spring of FIG. 3 showing the spring and energy stored position ready for use during periods of nonflow of water.

FIG. 5 is a segment of a side sectional view of the drive chain of the apparatus of FIG. 2 illustrating the means of transmitting the power stored in the ram of FIGS. 3–4 to drive the chain.

FIG. 6 is an end section taken along the line 6—6 of FIG. 2, further illustrating the mechanism for transmitting power from the spring to drive the chain of FIG. 2.

FIGS. 9–13 schematically illustrate the technique of this invention for achieving a triangular irrigation pattern by the alternating use of adjacent sprinkler heads.

With respect to the drawings, in FIG. 1 a pair of sprinkler line laterals 10 and 11 including a plurality of mobile carriages such as 13 which support lateral supply lines 14 and 15 are shown positioned in field 16 for the sprinkler irrigation thereof. Lines 14 and 15 are connected to a common water supply 17 by hoses 18 and 19 respectively. Water supply 17 comprises pump 20, synchronous valve assembly 21, and a control timer 22. In accordance with this invention lateral 10 for example might be in operation while lateral 11 is not being supplied with water. Pump 20 supplies a constant flow at full output through valve 21 to hose 18. After a preselected time, control timer 22 actuates valve 21 to slowly and synchronously shift the water supply from hose 18 to hose 19 so as to avoid "water hammer" surges. Lateral 11 would then be operated for a suitable period while lateral 10 is not supplied with water. In this manner an efficient constant water supply can be utilized despite the intermittent operation of the several sprinkler line laterals.

At some point the soil adjacent lateral 10 will have received a sufficient amount of water and it is desirable to move lateral 10 to a new location. In the preferred embodiment movement is accomplished with power supplied by the irrigation water and the apparatus shown in FIGS. 2–6. FIG. 2 illustrates a typical carriage such as carriage 13 of FIG. 1. An A-frame 23 supports a supply pipe 24 upon which sprinkler heads such as sprinkler head 25 are mounted. A pair of drums or wheels 26 and 27 are mounted for rotation on each of the ends of the legs of the A of A-frame 23 and includes suitable traction enhancing cleats such as cleat 28. Wheels 26 and 27 are driven by chain 29 which may pass around conventional sprockets attached to wheels 26 and 27.

Movement force is imparted from ram 30 conveniently mounted from the crossmember of frame 23. Water from supply pipe 24 is fed through line 31, check valve 32, to selector valve 33 (FIG. 3) at the input to ram 30. The specific construction and operation of ram 30 is best shown in FIGS. 3 and 4. As shown in FIG. 4, during periods of waterflow through line 24, water urges piston 34 to compress spring 35. At the termination of waterflow, control 36, after a suitable preselected time delay to allow drainage of residual water in the main lines, causes valve 33 to move to the position shown in FIG. 3 thereby allowing discharge of the water within ram 30. Piston 34 is moved the length of the cylinder of ram 30 during the release of the tension on spring 35. Connecting rod 37 is carried along with piston 34.

The movement shown in FIGS. 3 and 4 in turn produces a corresponding reciprocation of plate 38 which is joined to rod 37. Reciprocation of plate 38 provides the motive force for driving chain 29. As seen most clearly in FIGS. 5 and 6, plate 38 is L-shaped and notched at 39 and 40 to accommodate the upper and lower reaches of chain 29. A pivotally mounted bar 41 at the bottom of plate 38 is adapted for one-way ratchet-type engagement between the links of chain 29. As seen in FIG. 5 bar 41 is pivotally mounted at 42 on plate 38 and is movable without engagement with the links of chain 29 when moving towards the right side of FIG. 5. This corresponds to the spring compressing movement of piston 34 in FIG. 4. During the movement of piston 34, urged by the release of tension on spring 35 as shown in FIG. 3, bar 41 engages a link of chain 29 and moves chain 29 a distance equal to the stroke of piston 34.

Another bar 43 is provided at the top of plate 38 as shown in FIG. 2 in an inoperative position. Use of bar 43 instead of bar 41 provides a reverse movement of the carriage unit of FIG. 2. Pins 41a and 43a fix bars 41 and 43 respectively in an inoperative position as required.

In some farming applications it may be desirable to move or relocate the sprinkler line over distances much greater than can be accomplished with a single stroke of spring-loaded piston 34. Such flexiblity is desirable for instance when irrigating at the time of seed germination which requires a relatively small (one-half inch–1 inch) application of water at relatively frequent intervals (2 or 3 days). To avoid the inconvenience of filling and emptying the sprinkler pipeline simply to actuate hydraulic piston 34, a suitable auxiliary small diameter pipe 44 (see FIG. 2) may be installed on frame 23 and pipe 24 for connection to a water supply. As desired, water of sufficient pressure can be flowed through pipe 44 past check valve 45 to operate piston 34. Piston 34 can thus be cycled as many times as desired without the flow of water through main supply pipe 24. Movement by water from auxiliary pipe 44 can conveniently be accomplished while the remainder of the sprinkler apparatus is empty and light in weight.

A principal cause of operating trouble with all automatic move sprinkler systems is cumulative errors in relative distance of movement of the several carriage units, resulting in misalignment of the sprinkler line. This necessitates compensating adjustment by the farmer or shutdown of the system through operation of a suitable safety-limit control system. The improved system of this invention will substantially avoid such troubles because movement of the mobile carriages is precision controlled by the precision stroke length of the hydraulic power piston in each ram. The mobile carriages, while moving, support only the weight of the empty sprinkler line, with less likelihood of loss of traction, or digging into soft spots in the watered earth, less damage to crops and fields—and substantially less drag load of the empty connecting hose loop.

Movement of the sprinkler lines in an empty condition is made possible because the "on-off" mode of operation contemplated. When the "on"-position of the cycle has been completed, the sprinkler lines such as supply pipe 24 are preferably automatically drained. FIGS. 7 and 8 illustrate one suitable system for drainage. A plurality of trailing perforated flexible hoses 46 and 47 (to avoid spot puddling) are connected through valves 48 and 49 respectively to low points in supply pipe 24. Valves 48 and 49 may suitably be of the spring-loaded automatic drain-type valves known in the art. When waterflow is ceased through supply pipe 24, valves 48 and 49 automatically open and allow drainage to be spread through perforated hoses 46 and 47. Hoses 18 and 19 (FIG. 1) may concurrently be drained with similar automatic drain valve so that the entire lateral can be moved in an empty condition. As previously noted, control timer 22 is set to allow a sufficient time period for this drainage to occur before allowing piston 34 to be actuated by spring 35.

FIGS. 7 and 8 further illustrate novel supports provided by this invention. During movement of the lateral, the carriage units 50 and 51 support supply pipe 24 in the elevated position shown. Suitable overhead masts 52 and 53 together with cooperating suspension cables 54 and 55 may be used as required. A plurality of retractable supports between the carriage units such as retractable support 56 between carriage units 50 and 51 aid in supporting supply pipe 24.

In FIG. 7 retractable support 56 has its ground engaging member 57 retracted and out of contact with ground 58. The lateral including supply pipe 24 is thus in position for movement. Support for the intermediate position between carriage units 50 and 51 is not needed because supply pipe 24 is empty during movement. When in position for resumption of waterflow as shown in FIG. 8, ground engaging member 57 is extended and in contact with ground 58 to support supply pipe 24 between carriage units 50 and 51. At this time the added support is needed due to the increased weight of the water flowing in supply pipe 24. The retractable unit illustrated permits the overall lateral to be more lightly constructed. Without the retractable supports the other supporting parts would have to be strong enough to carry the weight of the lateral when full of water.

In accordance with the preferred embodiment retractable support 56 is designed for operation by a ram and spring of the type shown in FIGS. 3 and 4, with ground engaging member 57 being operated instead of plate 38 in FIGS. 3 and 4. The ram portion of retractable support 56 is simply oriented vertically and connected for water from supply pipe 24 through hose 60. A suitable time delay control and associated valves (not shown) may be used in the same manner as that discussed in connection with FIGS. 3 and 4.

FIGS. 9-13 illustrate how an optimum triangular pattern of irrigation can be achieved. With respect to FIG. 9, a pair of laterals 61 and 62 which may, if desired, be supplied with water from a common source as discussed in connection with FIG. 1, are provided with lateral supply pipe 63 and 64 respectively. Each lateral supply pipe 63 and 64 has a plurality of spaced-apart sprinkler heads such as sprinkler heads 65 and 66. In accordance with the present invention each sprinkler head is provided with valves (not shown) of the type operated by the commencement and cessation of waterflow and each of which can be set to operate 180° out of phase with its adjacent valves. Valves of this type are available commercially for alternate open-close ratchet actuation by retraction strokes of the spring-loaded ram (FIGS. 3-4).

Utilizing valves capable of this function, odd-numbered sprinklers can be set to operate on the commencement of waterflow on a first occasion while the valves of the even-numbered sprinkler heads are set to operate on the next commencement of waterflow at which time the odd-numbered valves are closed. Thus, as shown in FIG. 9 odd-numbered sprinkler heads (numbering from right to left) are actuated in lateral 61 during a first flow of water therethrough. After a predetermined period of time, waterflow to lateral 61 is ceased and water may be supplied to lateral 62 (as shown in FIG. 10) where its odd-numbered sprinkler heads are operating (numbering from left to right). During waterflow through lateral 62 residual water may be conveniently drained from lateral 61 as discussed above and lateral 61 is moved an appropriate distance for achieving the complete irrigation coverage desired. At the end of a suitable preselected period, waterflow to lateral 62 is terminated and recommenced through lateral 61 (as shown in FIG. 11) in its new position. During this second flow the even-numbered valves are opened and the odd-numbered valves are closed to produce the watering pattern shown.

During the time of this second waterflow through lateral 61, lateral 62 is moved an appropriate distance to achieve the desired irrigation coverage. Thereafter waterflow is recommenced through lateral 62 as shown in FIG. 12. In this second flow through lateral 62 even-numbered sprinklers are operated while the valves of the odd-numbered sprinklers are closed to achieve the desired triangular irrigation coverage. FIG. 13 illustrates the triangular coverage obtained where the above sequence is repeated a plurality of times as the laterals are moved across a field.

To illustrate the advantages of the intermittent application of water by sprinkling as compared with the constant application of water by sprinkling during a watering shift in terms of increased water infiltration or absorption rate, the following example is provided;

Approximately 2 pounds of dry soil were used per sample. The soil was placed in metal cylinders of 2½-inch diameter and 8-inch length having perforated bottoms. Water was applied at the top while the perforated bottom was maintained in one-fourth inch of water. Times were recorded for a predetermined amount of water to soak into the soil samples to the extent that no free surface water was apparent and glistening of the sand grains due to water had ceased. Prior to each test the soil was saturated with water and allowed to drain for a measured period.

The tests were conducted so that 0.3 inch of water was applied by sprinkling during each test. The constant application rates were predetermined so that at the end of the test there would be considerable free water on the soil surface, 0.02 inch to 0.05 inch. Times were recorded for end of application and end of free water (end of glistening). Each of these constant rate tests was followed on the same soil sample with the cyclic or intermittent spray application in which double the previous constant application rate was applied for a given period, then allowed to drain for a like period and the cycle repeated until the 0.3-inch water had been applied. At the end of each application period there would be increasing amounts of surface water present, but the length of time of application was predetermined, from interim testing, so that at the end of the last application the amount of free water would also be approximately 0.02inch-0.05 inch.

The following table summarizes the results of the tests:

TABLE

| Test No. | Type Soil | Infiltration Rate Inches of Water Per Hour | |
|---|---|---|---|
| | | Constant Application | Intermittent Application |
| 1 & 2 | Med. Light | 1.29 | 1.64 |
| 3 & 4 | Med. Light | 1.06 | 1.50 |
| 5 & 6 | Med. Light | 0.81 | 0.93 |
| | Average | 1.05 | 1.38 |

From the above data it can be seen that if water is sprayed at twice the rate only one-half of the application period, the soil will absorb 31 percent more water than when applied at the lower rate full time.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. Sprinkler irrigation apparatus comprising: a sprinkler line having a plurality of water discharge heads; means mounting the sprinkler line for movement over the ground; means for supplying an intermittent water supply to said sprinkler line for discharge through said heads; self-propulsion means mounted on said sprinkler line and being responsive to the intermittent nature of the flow of water to said sprinkler line for moving the latter; and means for draining the sprinkler line during intermittent periods of nonsupply of water to permit movement of said sprinkler line free from the weight of residual water in the line.

2. Sprinkler irrigation apparatus in accordance with claim 1, wherein said self-propulsion means comprises a hydraulic ram having a piston connected in fluid communication with the water supplied to said sprinkler line and a spring mounted for tensioning by movement of said piston, the flow of water to said sprinkler line connected to cause movement of said piston and tensioning of said spring, the tensioned spring providing sufficient stored energy for propulsion of the sprinkler line during periods of nonflow of water.

3. Sprinkler irrigation apparatus in accordance with claim 2 wherein said spring is mounted within said ram for compression by said piston.

4. Sprinkler irrigation apparatus in accordance with claim 2 and including an auxiliary conduit in communication with said ram for the optional supply of motivating fluid for said ram for actuation of said ram during periods of nonsupply of water to said sprinkler line.

5. A sprinkler irrigation apparatus comprising: a sprinkler line having a plurality of water discharge heads; means mounting the sprinkler line for movement over the ground; means coupled with the sprinkler line for moving the same; means supplying an intermittent water supply to said sprinkler line for discharge through said heads; individually operative valves for each of said water discharge heads, the valves of only even-numbered water discharge heads being set to open when the sprinkler line is at a first location and the valves of only odd-numbered water discharge heads being set to open after movement of said sprinkler line to a second location to produce a triangular irrigation pattern; and means for draining the sprinkler line during intermittent periods of nonsupply of water to permit movement of said sprinkler line free from the weight of residual water in the line.

6. Sprinkler irrigation apparatus in accordance with claim 5 wherein the valves of said sprinkler heads are adapted to operate in response to the intermittent flow of water to said sprinkler line.